UNITED STATES PATENT OFFICE.

ABRAHAM G. HALEY, OF GARDINER, MAINE.

COMPOSITION OF MATTER FOR JOURNAL-BEARINGS.

SPECIFICATION forming part of Letters Patent No. 485,688, dated November 8, 1892.

Application filed June 20, 1892. Serial No. 437,240. (No specimens.)

*To all whom it may concern:*

Be it known that I, ABRAHAM G. HALEY, a citizen of the United States, residing at Gardiner, in the county of Kennebec and State of Maine, have invented certain new and useful Improvements in Composition of Matter for Journal-Bearings, &c.; and I do hereby declare the following to be a full, clear, and exact description of the invention, such as will enable others skilled in the art to which it appertains to make and use the same.

My invention relates to an improved antifriction composite substance for journal-bearings, axle-boxes, &c., made from certain ingredients combined and molded and hardened, as hereinafter particularly set forth. The substances which I make use of in my antifriction composition are plumbago, a metallic pigment, preferably white lead, and a binding or cementing material, such as glue or gum-shellac. The plumbago gives to the composition its antifriction character, the metallic pigment has a tendency to harden, and it is at the same time largely antifrictional in character, and the glue or other cementing material acts as a binder. The addition of a fiber—such as asbestus or pulp fiber—tends to strengthen the composition and hold it more firmly together.

My composition, in the form in which I prefer to make it, I compound as follows, viz: I take, by weight, sixteen parts of pulverized plumbago, eight parts of dry white lead, and one part of asbestus, place them in a suitable receptacle, and thoroughly mix and incorporate them together by grinding, kneading, or in any other suitable manner, adding thereto while being mixed, as a cementing or binding substance, a sufficient quantity of glue dissolved in water to bring the mixture to such consistency that it can be readily molded into any desired form or shape. Instead of dissolving the glue in water it may be dissolved or digested in linseed-oil, if preferred. After the ingredients have been thoroughly commingled and the mass brought to a plastic condition, as above described, the composition is placed in a mold and submitted to pressure for the purpose of giving it the desired shape to adapt it for the use to which it is to be applied. After being compressed and dried the article is removed from the mold and placed in a retort or in an open or closed oven, where it is baked or subjected to a sufficient degree of heat to harden and solidify it and render it capable of resisting the heavy pressure and wear to which it may be subjected, when it will be ready for use. Should the article molded as above described not be of accurate shape, it can be fitted by proper tools to the space which it is to occupy. When the bearing is to be used under water, I substitute for the glue as a binding material gum-shellac or other waterproof binder.

I do not wish to limit myself to the exact proportions of the ingredients above described, as they may be varied without departing from the spirit of my invention.

The above-described composition of matter, on account of its durability and self-lubricating qualities, is especially adapted for journal-bearings, packings, axle-boxes, and linings for the same and for other articles wherever there may be frictional contact between two parts. I vary the proportions of the ingredients above described, also, according to the size, speed, and weight of the bearings of frictional parts.

I claim—

1. The herein-described composition of matter for journal-bearings, &c., consisting of graphite, metallic pigment, fiber, and a cementing or binding substance, substantially as described.

2. The herein-described composition of matter for journal-bearings, &c., consisting of graphite, lead pigment, and a binding or cementing substance, substantially as described.

3. The herein-described composition of matter for journal-bearings, &c., consisting of graphite, metallic pigment, and a binding or cementing substance, substantially as described.

In testimony whereof I affix my signature in presence of two witnesses.

ABRAHAM G. HALEY.

Witnesses:
A. M. SPEAR,
F. E. POTTER.